May 28, 1940. M. MENTLEY 2,202,709
MACHINE FOR MANUFACTURING ROTARY GEAR CUTTERS
Filed July 26, 1937 3 Sheets-Sheet 1
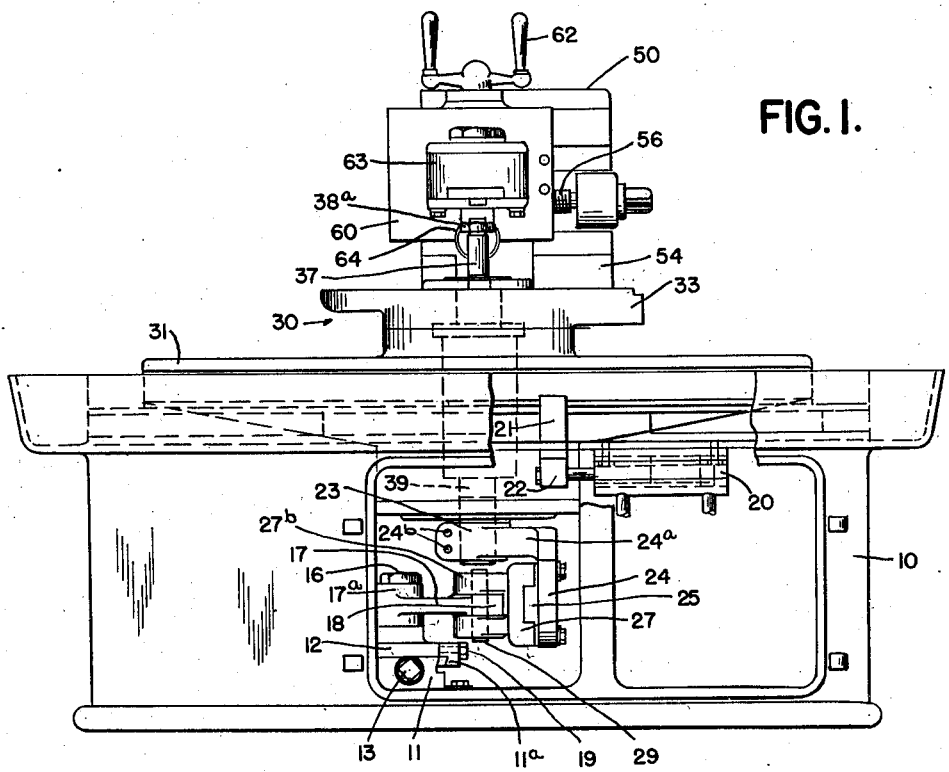
FIG. I.
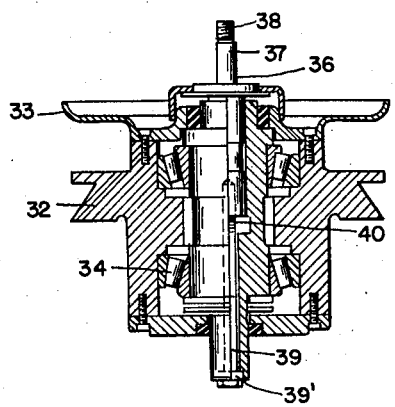
FIG. 4.
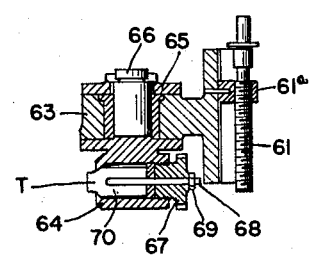
FIG. 5.
INVENTOR
MAX MENTLEY
BY
Whittemore Hulbert + Belknap
ATTORNEYS May 28, 1940.  M. MENTLEY  2,202,709

MACHINE FOR MANUFACTURING ROTARY GEAR CUTTERS

Filed July 26, 1937  3 Sheets-Sheet 2

INVENTOR
MAX MENTLEY
BY
ATTORNEYS

May 28, 1940.  M. MENTLEY  2,202,709
MACHINE FOR MANUFACTURING ROTARY GEAR CUTTERS
Filed July 26, 1937  3 Sheets-Sheet 3
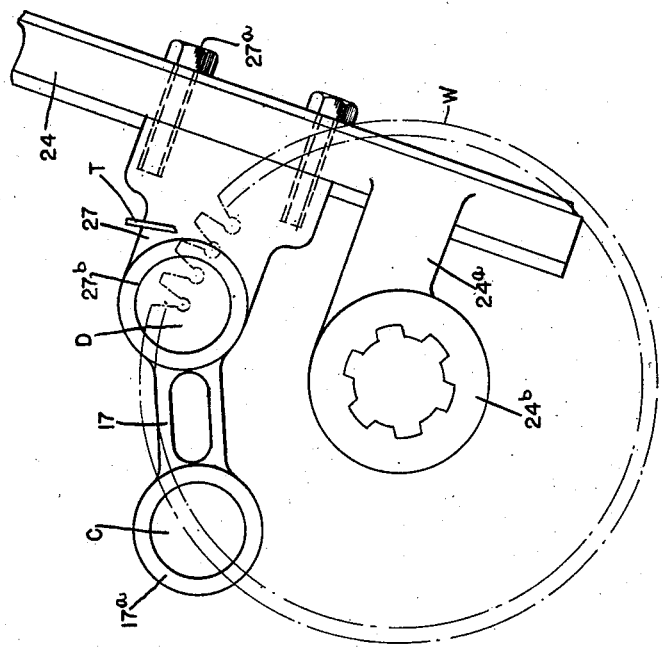
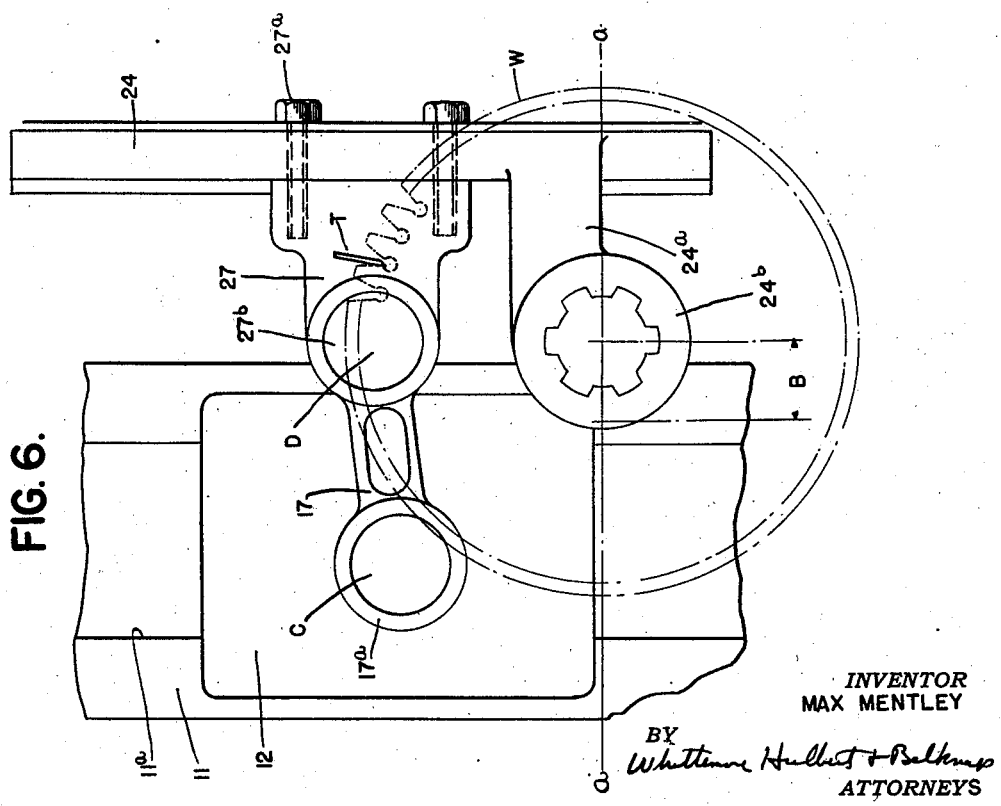
INVENTOR
MAX MENTLEY
ATTORNEYS Patented May 28, 1940

2,202,709

UNITED STATES PATENT OFFICE 2,202,709

MACHINE FOR MANUFACTURING ROTARY GEAR CUTTERS

Max Mentley, Detroit, Mich., assignor to National Broach & Machine Company, Detroit, Mich., a corporation of Michigan Application July 26, 1937, Serial No. 155,805

21 Claims. (Cl. 90—24)

This invention relates to a serrating machine adapted to cut serrations in the face of gear teeth in the manufacture of gear-like cutting tools.

It is an object of the invention to provide a self-contained serrating machine which has means for adjustment to accommodate gears of any predetermined size.

It is a further object of the invention to provide a serrating machine which operates to simultaneously translate and rotate a gear relative to the cutting tool.

It is a further object of the invention to provide means for rotating a gear in predetermined relationship to the translation of the gear member.

It is a further object of the invention to provide adjustable linkage mechanism for rotating a gear member in response to translation of said member.

It is a further object of the invention to provide a serrating machine which may be adjusted to take cuts of uniform, or of progressively increasing or decreasing depth from the face of the tooth.

Other objects of the invention will be apparent as this description proceeds and when taken in conjunction with the accompanying drawings in which Fig. 1 is a front elevation of my improved serrating machine with a portion of the frame removed to show the linkage mechanism;

Fig. 4 is a vertical section through the work carrying head taken on the lines 4—4 of Fig. 1;

Fig. 5 is a vertical section of my improved tool holder;

Figs. 6 and 7 are detailed views showing the linkage mechanism in extreme limiting positions.

This machine is intended for use in the manufacture of cutting tools to be used in gear cutting machines of the type disclosed in the copending application of Robert S. Drummond, Ser. No. 3,662, filed January 26, 1935. In this type of machine the cutting tool is in the form of a gear member with serrations cut into the faces of the teeth. This tool is run in mesh in crossed axial relationship with a roughed out gear which is to be finished. At the same time one of the members is reciprocated to distribute the cutting action across the face of the gear member. In the manufacture of these cutting tools, various methods have been employed to form the serrations in the faces of the teeth. One of the early methods was to form a tool of a plurality of thin laminae of alternately greater and less size and these laminae were rigidly bolted together to form an assembled tool. This method did not prove entirely satisfactory and other mechanism was devised to cut the serrations in the faces of a solid gear blank which was to form the tool member. The present invention relates to an improved machine which is adapted by the inclusion of suitable adjustable means to cut serrations in the teeth of any practical size gear shaped tool member.

Figure 2:
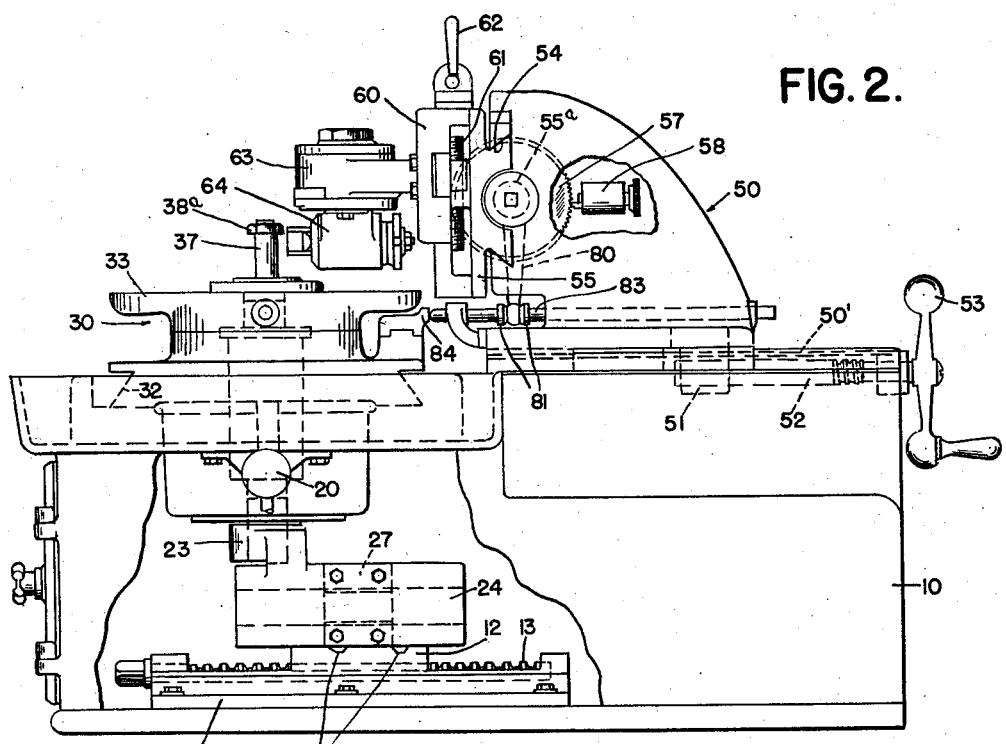
Fig. 2 is a side elevation of the machine shown in Fig. 1 with a portion of the frame broken away to show the linkage mechanism.
Figure 3:
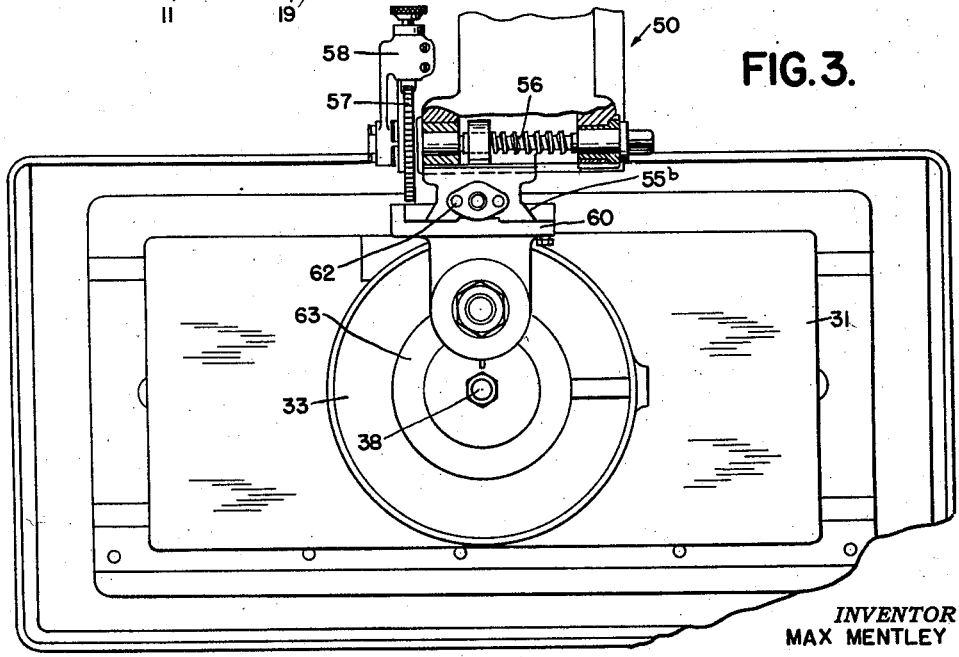
Fig. 3 is a top plan view of the machine.

As best seen in Fig. 2, the machine as a whole comprises a frame 10 in which is housed suitable driving mechanism. Mounted on the frame 10 for reciprocation is a work carrying table 30. This table supports the gear member being cut for rotation about a vertical axis. A tool carrying head 50 is mounted for adjustment relative to the work carrying table and on this head is adjustably supported the tool T. It is contemplated that this machine may be driven by means of an electric motor or by suitable hydraulic means, or any other desired means. I have illustrated, however, a hydraulic driving mechanism.

The work carrying table 30 is mounted on the frame 10 for reciprocation in a longitudinal direction in ways 32, Fig. 2. This work carrying table comprises a main table portion 31 and a generally upwardly open cup shaped member 33. Mounted for rotation about a vertical axis in the table in suitable bearings 34 is a vertical shaft 36. This shaft 36 has at its upper end a portion 37 on which is mounted a gear to be cut. Above this portion is a screw threaded portion 38 adapted to receive a nut 38ᵃ to clamp the gear in place. A shaft 39 is provided with screw threads 40 at its opposite end to be threadedly engaged with the shaft 36. The lower portion of the shaft 39 is received within a collar 39' to which is secured the linkage mechanism later to be described.

The mechanism for supporting the tool T in fixed relationship to the gear being cut comprises a head 50 which is mounted for adjustment transverse to the direction of reciprocation of the work table in suitable ways 50'. A depending lug 51 is secured to the head 50 and is internally screw threaded to receive a threaded member 52. The member 52 is journaled for rotation in the frame and is adapted to be rotated by a suitable hand wheel 53. As will be apparent, rotation of the hand wheel 53 provides for adjustment of the head 50 toward and away from the work carrying table. Mounted on the head 50 in suitable ways 54 is a tool carriage 55. The tool carriage 55 has a screw threaded lug 55ᵃ adapted to receive a threaded member 56. This threaded member 56 carries a ratchet wheel 57 and a ratchet 58 is mounted adjacent the ratchet wheel to provide for feeding the tool carriage in a direction parallel to the direction of reciprocation of the work carrying table. The ratchet mechanism may be manually controlled or it may be automatically controlled. Fig. 2 illustrates one form of automatic control. A cam 84 is carried by the work carrying table 30. This cam upon reciprocation of the table is adapted to engage a push rod 83 suitably mounted on the frame of the machine. The push rod 83 which is spring biased toward the cam has two spaced lugs 81 thereon. Received between the lugs 81 is a free end of a lever 80 which is suitably connected to the ratchet lever 68. It will be obvious that upon actuation of the push rod 83 by the cam 84 the ratchet wheel 57 will be rotated a predetermined number of notches. The tool carriage 55 has vertically extending ways 55ᵇ thereon and mounted on these ways is an intermediate member 60. The member 60 has an extending lug 61ᵃ internally screw threaded to receive a threaded member 61 which is carried by the tool carriage 55. A crank 62 is provided on the upper end of the threaded member 61 for rotating the same. It will be apparent that upon rotation of the threaded member 61 the intermediate member 60 will be adjusted in a vertical direction. Carried by the intermediate member 60 is a cylindrical supporting member 63, in which is journaled for rotation a tool supporting member 64. The support for this member includes a cylindrical portion 65 which is received within the portion 63 and which is retained in position by a nut engaging the upper portion 66 of the cylindrical portion 65. Due to this arrangement, the tool supporting member 64 may be rotated about a vertical axis and clamped in adjusted position. A tool T is carried in the lower portion of the tool supporting member 64. For this purpose the lower portion of the tool supporting member 64 is provided with a hollow aperture 70 in which the tool may be rotated to correspond to the helix angle of the gear being serrated and which is tapered to a smaller diameter at one end. The tool T is carried within the aperture 70 and projects through the tapered outlet. A feed screw 68 is provided to engage the back of the tool and to position the tool with a predetermined amount thereof projecting through the tapered aperture. The feed scrw 68 is received within a plug 67 which closes the enlarged open end of the aperture 70 and a suitable locking nut 69 engages the feed screw.

In order to reciprocate the work carriage 30 I provide thereon a depending lug 21. Secured to the lug 21 by suitable securing means indicated generally at 22 is the piston of a hydraulic cylinder 20. The hydraulic cylinder 20 is rigidly secured to the stationary portion of the frame 10 and is supplied with fluid under pressure from a suitable source such for example as a fluid pump and electric motor contained within the frame 10. It is obvious that in place of hydraulic means for reciprocating the work carrying table, an electric motor or other source of power could be employed with equal facility.

In order for the serrating tool T to cut serrations of uniform or predeterminedly varying depth in the face of the teeth, it is necessary that the gear carried on the spindle 37 have imparted thereto a predetermined rotation relative to the translation. Since the teeth of the gear which is to form the cutting tool are ordinarily substantially involute in character, it is desired that this relative translation and rotation shall be such as to generate a curve approximating an involute. In order to provide for this generation, I provide the following mechanism. Secured to the base of the frame 10 is a member 11 having formed thereon a guideway 11ᵃ. A second member 12 embraces the guideway and is mounted for adjustment thereon. A suitable screw threaded means 13 is provided to accomplish adjustments between the parts 11 and 12, or in other words, to position the part 12 in a predetermined position relative to the path of the axis of the work gear, and suitable securing means 19 lock the part 12 in adjusted position. A link 17 is provided with a cylindrical sleeve portion 17ᵃ and embraces a pin 16 which is secured by a suitable screw threaded connection to the member 12. The opposite end of the link 17 has a second cylindrical sleeve portion 18, which embraces a pin 29. Pivoted to the pin 29 is a second compound link which comprises portions 24 and 27. The portion 27 has two cylindrical sleeve portions 27ᵇ which embrace the pin 29 in freely pivotal relationship. The member 27 has a longitudinally extending guiding recess therein to receive a cooperating projection 25 on the member 24, as best seen in Fig. 1. This provides for adjustment of the linkage by in effect lengthening the link joining the pin 29 and the axis of the gear. Suitable clamping means 27ᵃ are provided to clamp this adjustable link in position. The member 24 has an upstanding off-set portion 24ᵃ which terminated in a cylindrical sleeve 23 and is adapted to be rigidly clamped by suitable clamping means 24ᵇ to the lower end of the member 39.

As best seen in Figs. 6 and 7, this linkage mechanism just described will operate to impart predetermined variable rotation to the gear member as the gear member is reciprocated with the work carrying table 30. Figs. 6 and 7 illustrate two extreme positions of the work carrying table. In Fig. 6 the tool T is shown in the position it occupies after the completion of a cut. It will be noted that the cut taken by the tool T is from the top to the bottom of the teeth of the gear. The gear is translated along the line a—a a distance indicated by the letter B. The linkage shown is fixed at the point C and pivots thereabout. As a result, the center of the cylindrical portion 27ᵇ designated by the numeral D is constrained to move in a circular arc about the point C. The axis of the gear W being cut is constrained to move in the rectilinear path a—a and as a result the point D will be moved in its circular path amounts varying with the position of the gear along its path. As a result of this, the gear W is rotated in a predetermined but irregular manner synchronously with its translation. In Fig. 7 the parts are shown in the other extreme position with the gear W moved away from the tool T. It will be seen that the adjustment provided will allow the relative rotation of the gear to be accurately predetermined. This adjustment includes translation of pivot point C in a direction perpendicular to the line of translation of the gear member and also provides for in effect the lengthening of the link which connects the pivot point D and the axis of the gear member W.

The feed of the tool member as previously described is accomplished by means of rotation of the ratchet wheel 57 and therefore of the threaded member 56. This causes feeding movement of the tool carriage 55 in a direction parallel to the direction of travel of the work gear. In Fig. 6 feeding movement of the tool T moves the tool to the left, thereby causing succeedingly deeper cuts to be taken in the face of the teeth.

After a predetermined number of strokes and after the serrations have been cut to a predetermined depth the gear member is indexed to the next position. The opposite sides of the teeth may be cut by reversing the gear member on its spindle.

One of the important advantages of my present serrating machine resides in the fact that the mechanism is adjustable so that any ordinary sized gear may be serrated without the necessity of substituting this guiding means. This is accomplished as previously described by adjusting the linkage mechanism relative to the gear being cut. My improved tool supporting means is also novel and offers important advantages over similar tool supporting means employed in the past.

Another important advantage of my improved adjustable serrating machine resides in the fact that by suitably adjusting the linkage mechanism, serrations of predetermined depth may be cut or alternately if desired serrations may be cut which are of either increasing or decreasing depth from the tip to the root of the teeth. This last is particularly important in gears of teeth of relatively fine pitch. In such gears it is oftentimes the case that serrations of uniform normal depth from top to bottom would weaken the teeth at the roots thereof. In these cases it is therefore desirable to serrate the teeth with serrations of decreasing depth from the tip to the root of the teeth. This preserves the necessary strength for the teeth. It is also desirable to provide serrations of variable depth in certain cases, since in regrinding different amounts of material may be removed at the tip and root of the teeth. Where this is the case it is desirable of course to provide deeper serrations at the point at which the most material is removed in regrinding.

While I have illustrated and described various proposed embodiments of my invention, it will be apparent to those skilled in the art that various additions, omissions, substitutions and modifications may be made within the scope of my invention, as indicated by the appended claims.

What I claim as my invention is:

1. A serrating machine for cutting serrations in the faces of gear teeth comprising means for mounting the gear to be serrated for translation and rotation, means for holding a serrating tool rigidly in adjusted position, means for translating said gear, self contained adjustable means for rotating said gear in predetermined relation to said translation, said adjustable means providing for taking a cut of substantially uniform, progressively increasing, or progressively decreasing depth from tip to root of the gear teeth.

2. In a machine of the class described, a work holding spindle, means for mounting said spindle for translation and for rotation, means for translating said spindle, means for rotating said spindle so that said rotation and translation approximate rolling motion of a circular part of predetermined diameter comprising a lever fixed to said spindle, said lever being of adjustable effective length, a relatively fixed member, and a link pivoted to said lever and to said member.

3. In a machine of the class described, a work holding spindle, means for mounting said spindle for translation and for rotation, means for translating said spindle, means for rotating said spindle so that said rotation and translation approximate rolling motion of a circular part of predetermined diameter comprising a lever fixed to said spindle, an adjustable member, means for adjusting said adjustable member during operation of the machine, a link pivoted to said lever and to said member.

4. In a machine of the class described, a work holding spindle, means for mounting said spindle for translation and for rotation, means for translating said spindle, means for rotating said spindle so that said rotation and translation approximate rolling motion of a circular part of predetermined diameter comprising a lever fixed to said spindle, a supporting member, a link pivoted to said lever and to said supporting member, said member being adjustable in a direction transverse to the direction of translation of said spindle.

5. A serrating machine for cutting serrations in the faces of gear teeth comprising a support for mounting a gear to be serrated for translation and rotation, means for holding a serrating tool rigidly in adjusted position, means for translating said support, and adjustable means for rotating said support in predetermined relation to said translation.

6. A serrating machine for cutting serrations in the faces of gear teeth comprising a support for mounting a gear to be serrated for translation and rotation, means for holding a serrating tool rigidly in adjusted position, means for translating said support, linkage for rotating said support in response to translation, said linkage being adjustable whereby a predetermined generating motion will be imparted to a gear mounted on said support relative to the tool.

7. A serrating machine for cutting serrations in the faces of gear teeth comprising a support for mounting a gear to be serrated for translation and rotation, means for holding a serrating tool rigidly in adjusted position, means for translating said support, self-contained adjustable means for rotating said support in predetermined relation to said translation.

8. A serrating machine for cutting serrations in the faces of gear teeth comprising a support for mounting a gear to be serrated for translation and rotation, means for holding a serrating tool rigidly in adjusted position, means for translating said support, adjustable means for rotating said support in predetermined relation to said translation, and automatic means for feeding said tool holding means relative to said support at the beginning of a cutting stroke.

9. A serrating machine for cutting serrations in the faces of gear teeth comprising a support for mounting a gear to be serrated for reciprocation and rotation, means for holding a serrating tool rigidly in adjusted position, means for reciprocating said support, adjustable means for rotating said support in predetermined relation to said reciprocation.

10. A serrating machine for cutting serrations in the faces of gear teeth comprising a support for mounting a gear to be serrated for reciprocation and rotation, means for holding a serrating tool rigidly in adjusted position, means for reciprocating said support, linkage for rotating said support in response to reciprocation, said linkage being adjustable whereby a predetermined generating motion will be imparted to a gear carried by said support relative to the tool.

11. A serrating machine for cutting serrations in the faces of gear teeth comprising a support for mounting a gear to be serrated for reciprocation and rotation, means for holding a serrating tool rigidly in adjusted position, means for reciprocating said support, adjustable means responsive to said reciprocation for rotating said support in predetermined relation to said reciprocation, and automatic means for feeding said tool holding means relative to said support at the beginning of each reciprocation.

12. A serrating machine for cutting serrations in the faces of gear teeth comprising means for mounting a gear to be serrated for translation and rotation, means for holding a serrating tool rigidly in adjusted position, means for translating said gear, self-contained adjustable means responsive to the translation of said gear for rotating said gear in predetermined relation to said translation, said adjustable means providing for taking a cut of substantially uniform, progressively increasing, or progressively decreasing depth from tip to root of the gear teeth.

13. In a machine of the class described, a frame, a work spindle, means for rectilinearly reciprocating said spindle, a lever rigidly secured to said spindle and extending radially therefrom, a link pivoted at one end to said lever, and at the other end to said frame, said lever and link causing predetermined rotation of said spindle upon reciprocation of said spindle.

14. In a machine of the class described, a frame, a work spindle, means for rectilinearly reciprocating said spindle, a lever rigidly secured to said spindle and extending radially therefrom, a link pivoted at one end to said lever, adjustable means for varying the effective length of said lever, the other end of said link being pivoted to said frame.

15. In a machine of the class described, a frame, a work spindle, means for rectilinearly reciprocating said spindle, a lever rigidly secured to said spindle and extending radially therefrom, a link pivoted at one end to said lever, a member carried by said frame, adjustable thereon, and adapted to be clamped in adjusted position thereto, said link pivoted at the other end to said member.

16. In a machine of the class described, a frame, a work spindle, means for rectilinearly reciprocating said spindle, a lever rigidly secured to said spindle and extending radially therefrom, a link pivoted at one end to said lever, adjustable means for varying the effective length of said lever, a member carried by said frame, adjustable thereon, and adapted to be clamped in adjusted position thereto, said link pivoted at the other end to said member.

17. In a machine of the class described, a tool support, a work spindle for mounting a gear-like work piece of any predetermined diameter, means for translating said work spindle relative to said tool, linkage means responsive to translation for rotating said work spindle, said last named means being adjustable so as to adjust the rotation of said work spindle relative to translation to produce a rolling motion of said spindle corresponding substantially to the diameter of said work piece.

18. In a machine of the class described, a tool support, a work spindle for mounting a gear-like work piece of any predetermined diameter, means for translating said work spindle relative to said tool, linkage means responsive to translation for rotating said work spindle, said last named means being adjustable so as to adjust the rotation of said work spindle relative to translation to produce a rolling motion of said spindle corresponding substantially to the diameter of said work piece, said linkage means including a lever carried by said spindle, and a second lever pivoted to said first lever and to a member adjustable on said machine.

19. In a machine of the class described, a tool support, a work spindle for mounting a gear-like work piece of any predetermined diameter, means for translating said work spindle relative to said tool, linkage means responsive to translation for rotating said work spindle, said last named means being adjustable so as to adjust the rotation of said work spindle relative to translation to produce a rolling motion of said spindle corresponding substantially to the diameter of said work piece, said linkage means including a lever carried by said spindle, and a second lever pivoted to said first lever and to a member adjustable on said machine and means for adjusting said last named member during operation of said machine.

20. A serrating machine for cutting serrations in the faces of gear teeth comprising a support for mounting a gear to be serrated for translation and rotation, means for holding a serrating tool rigidly in adjusted position, means for translating said support, adjustable means for rotating said support in predetermined relation to said translation and means for feeding said tool holding means relative to said support.

21. A serrating machine for cutting serrations in the faces of the gear teeth comprising a support for mounting a gear to be serrated for reciprocation and rotation, means for holding a serrating tool rigidly in adjusted position, means for reciprocating said support, linkage for rotating said support in response to reciprocation.

MAX MENTLEY.